(12) United States Patent
Hayman

(10) Patent No.: US 8,925,501 B2
(45) Date of Patent: Jan. 6, 2015

(54) CRANKSHAFT FOR AN INTERNAL COMBUSTION ENGINE

(75) Inventor: Alan W. Hayman, Romeo, MI (US)

(73) Assignee: GM Global Technology Operations LLC, Detroit, MI (US)

(*) Notice: Subject to any disclaimer, the term of this patent is extended or adjusted under 35 U.S.C. 154(b) by 326 days.

(21) Appl. No.: 13/368,398

(22) Filed: Feb. 8, 2012

(65) Prior Publication Data

US 2013/0199502 A1    Aug. 8, 2013

(51) Int. Cl.
*F02B 75/04*    (2006.01)

(52) U.S. Cl.
USPC ............... 123/48 B; 123/53.1; 123/197.4; 74/596

(58) Field of Classification Search
CPC ...... F02B 75/04; F02B 75/045; F02B 75/048; F02D 15/02; F16C 11/02; F16C 3/20; F16C 3/06; F16C 53/006
USPC ............. 123/48 B, 51 BB, 53.1, 78 F, 197.4; 74/591–602
See application file for complete search history.

(56) References Cited

U.S. PATENT DOCUMENTS 2,378,686 A * 6/1945 Carstens ................... 74/597
6,386,153 B1 * 5/2002 Rao et al. .................. 123/48 B

* cited by examiner

*Primary Examiner* — Lindsay Low
*Assistant Examiner* — Omar Morales
(74) *Attorney, Agent, or Firm* — Cantor Colburn LLP

(57) ABSTRACT

A crankshaft for an internal combustion engine comprises at least four main journals aligned on a crankshaft axis of rotation and at least three crankpins, each crankpin being disposed about a respective crankpin axis and positioned between the main journals. Each of the respective crankpin axes is oriented parallel to, and spaced radially from, the crankshaft axis of rotation. Each of the crankpins is joined to a pair of crank arms for force transmission between the crankpin and the pair of crank arms. Each pair of crank arms is joined to a respective main journal for transmitting torque between the pair of crank arms and the main journal. At least two of the crankpins are spaced radially a first semi-stroke distance from the crankshaft axis of rotation, and a third crankpin is spaced radially a second semi-stroke distance from the crankshaft axis of rotation.

18 Claims, 6 Drawing Sheets

CRANKSHAFT FOR AN INTERNAL COMBUSTION ENGINE

FIELD OF THE INVENTION

Exemplary embodiments of the invention relate to crankshafts for internal combustion engines and, more particularly, to a crankshaft for an internal combustion engine having a grouping of three crankpins, in which two of the crankpins are disposed a first distance from a centerline of the crankshaft and a third crankpin is disposed a second distance from the centerline of the crankshaft.

BACKGROUND

With the increased focus on vehicle economy, particularly vehicle fuel economy, automotive manufacturers are turning to smaller, lighter vehicles and unique vehicle powertrains to boost efficiency. Recirculated exhaust gas ("EGR") is utilized in most conventional internal combustion engines to assist in the reduction of throttling losses at low loads, and to improve knock tolerance and reduce the level of oxides of nitrogen ("$NO_x$") in the exhaust gas at high engine loads. EGR is especially important as an emissions reducer in internal combustion engines that run lean of stoichiometry and thereby are prone to emitting higher levels of $NO_x$ emissions.

One proposition that has been considered in the construction of internal combustion engine systems is to utilize one of a plurality of cylinders as a dedicated EGR source. For example, in a four cylinder engine, the entire supply of exhaust gas produced in one of the cylinders is transferred to the intake ports of the other three cylinders as EGR. The EGR-producing cylinder may be operated at customized levels of air and fuel; as may be determined by an engine controller that is in signal communication with various engine, vehicle and exhaust system sensors. Since the exhaust gas from the EGR-producing cylinder is to be re-circulated before being released to the atmosphere, the customized air and fuel levels in the EGR-producing cylinder may be optimized to achieve selected goals such as engine efficiency, power, and operability.

Since exhaust gas produced by the remaining two cylinders is to be released to the atmosphere following treatment in an exhaust gas treatment system, the air and fuel mixtures of these remaining cylinders are operated so as to meet emission standards. Fortuitously, these remaining cylinders enjoy benefits associated with ingestion of EGR from the EGR-producing cylinder. These benefits include reduced combustion temperatures and associated levels of $NO_x$, allowing richer levels of EGR in the remaining cylinders with increased levels of hydrogen, thereby improving knock resistance, fuel consumption and combustion stability, while still allowing stoichiometric gas to be maintained in the exhaust gas treatment system for compatibility with the catalytic treatment devices.

A disadvantage to this type of internal combustion engine system is that an internal combustion engine that uses only a single cylinder as the dedicated EGR cylinder may not uniformly deliver EGR volumes to the remaining cylinders. For example, the cylinder event following the dedicated EGR cylinder event may be prone to receive more EGR diluent than the subsequently firing cylinders. This variation in cylinder makeup (i.e. combustion air, fuel and EGR diluent) can result in uneven combustion performance that is difficult to control over a broad range of operating conditions.

To at least partially address these disadvantages, a number of configurations are being studied, including configurations wherein more than one in four cylinders operates as a dedicated EGR cylinder or where a dedicated EGR cylinder produces more than a single volume of exhaust gas for every four volumes of exhaust gas produced by other cylinders. To enable such configurations, it would be advantageous to have a crankshaft that can facilitate improved distribution of EGR among non-EGR cylinders. It would also be advantageous to have a crankshaft that can enable cylinders displacements that differ between the EGR and non-EGR cylinders.

SUMMARY

In an exemplary embodiment, a crankshaft for an internal combustion engine comprises at least four main journals aligned on a crankshaft axis of rotation and at least three crankpins, each crankpin being disposed about a respective crankpin axis and positioned between the main journals. Each of the respective crankpin axes is oriented parallel to, and spaced radially from, the crankshaft axis of rotation. Each of the crankpins is joined to a pair of crank arms for force transmission between the crankpin and the pair of crank arms. Each pair of crank arms is joined to a respective main journal for transmitting torque between the pair of crank arms and the main journal. At least two of the crankpins are spaced radially a first semi-stroke distance from the crankshaft axis of rotation, and a third crankpin is spaced radially a second semi-stroke distance from the crankshaft axis of rotation.

In another exemplary embodiment, a rotating group for a three cylinder internal combustion engine comprises three pistons that are each associated with a respective cylinder and connected through a respective connecting rod to a respective crankpin. The crankpins are disposed on a single crankshaft that comprises at least four main journals aligned on a crankshaft axis of rotation. At least three crankpins are disposed about a respective crankpin axis and positioned between the main journals. Each of the respective crankpin axes is oriented parallel to, and spaced radially from, the crankshaft axis of rotation. Each of the crankpins is joined to a pair of crank arms for force transmission between the crankpin and the pair of crank arms. Each pair of crank arms is joined to a respective main journal for transmitting torque between the pair of crank arms and the main journal, and at least two of the crankpins are spaced radially a first semi-stroke distance from the crankshaft axis of rotation. A third crankpin is spaced radially a second semi-stroke distance from the crankshaft axis of rotation.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
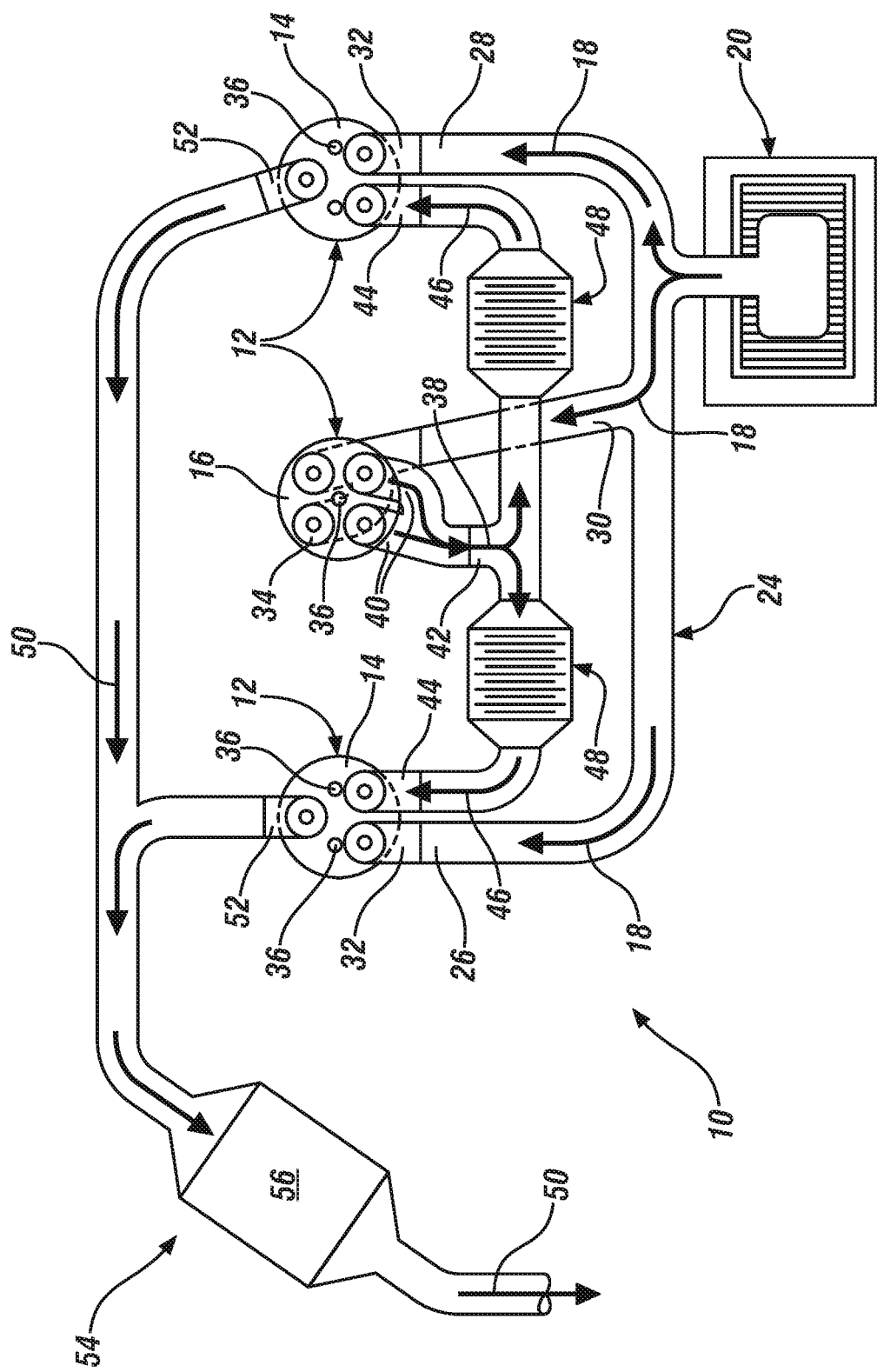
FIG. 1 is a schematic plan view of portions of an internal combustion engine system embodying features of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an internal combustion engine system 10 comprising a plurality of engine cylinders 12. In the embodiment illustrated, the internal combustion engine system 10 includes three engine cylinders 12, however the configuration may also include any number of cylinders (ex. 3, 4, 5, 6, 8, 10, 12, etc.) as well as configurations such as in-line (shown), V-configured, horizontally opposed and the like, without affecting the application of the invention thereto.

Referring to the engine cylinders 12 in the embodiment shown, the first and third cylinders 14 are configured to operate on a four-stroke combustion cycle. Contrarily, the second cylinder 16 is a dedicated EGR cylinder and is configured to operate on a 2-stroke combustion cycle; as will be described in further detail below. Combustion air 18 is compressed by a compressor 20 which may comprise an engine driven supercharger, an exhaust driven turbocharger or a combination of both (i.e. super-turbocharger) and is delivered to each of the engine cylinders 12 through a portion of an intake system 24 comprising intake runners 26, 28 and 30. The intake runners 26, 28 and 30 deliver the compressed combustion air to the 4-stroke cylinders 14 through intake ports 32 and to the 2-stroke cylinder through intake port or ports 34. The combustion air 18 is mixed with fuel in the cylinders 14 and 16, and is combusted therein. One or more ignition devices such as spark plugs 36 are located in communication with the cylinders 14 and 16 and operate to ignite the fuel/air mixture therein.

In an exemplary embodiment, exhaust gas 38 from the combustion of fuel and combustion air 18 in the 2-stroke, dedicated EGR cylinder 16 is removed from the cylinder 16 through one or more exhaust ports 40 in fluid communication with an EGR supply conduit 42 extending between, and in fluid communication with, intake ports 44 that are configured to deliver the exhaust gas 38 to the 4-stroke cylinders 14 as recirculated exhaust gas ("EGR") 46. The recirculated exhaust gas 46 is mixed with the combustion air 18 and fuel in each 4-stroke cylinder 14 prior to combustion thereof. The EGR 46 supplied from the 2-stroke, dedicated EGR cylinder 16 to the 4-stroke cylinders 14 functions to assist in the reduction of throttling losses at low loads and to improve knock tolerance and reduce the level of oxides of nitrogen ("$NO_x$") in the exhaust gas.

In an exemplary embodiment, one or more heat exchangers 48 may be disposed between the 2-stroke, dedicated EGR cylinder 16 and the intake ports 44 of the 4-stroke cylinders 14 to cool the EGR charge 46 allowing for a cooler and, thus, denser flow of EGR into the 4-stroke cylinders 14. The heat exchangers 48 may be of an air cooled or liquid cooled configuration. In an exemplary embodiment, exhaust gas 50 from the combustion of fuel, combustion air 18 and EGR 46 in the 4-stroke cylinders 14 is removed from the cylinders through one or more exhaust ports 52 in fluid communication with an exhaust gas treatment system 54 that may include various exhaust gas treatment devices 56 such as a catalytic converter, a selective catalytic reduction device, a particulate trap or a combination thereof.

Figure 2:
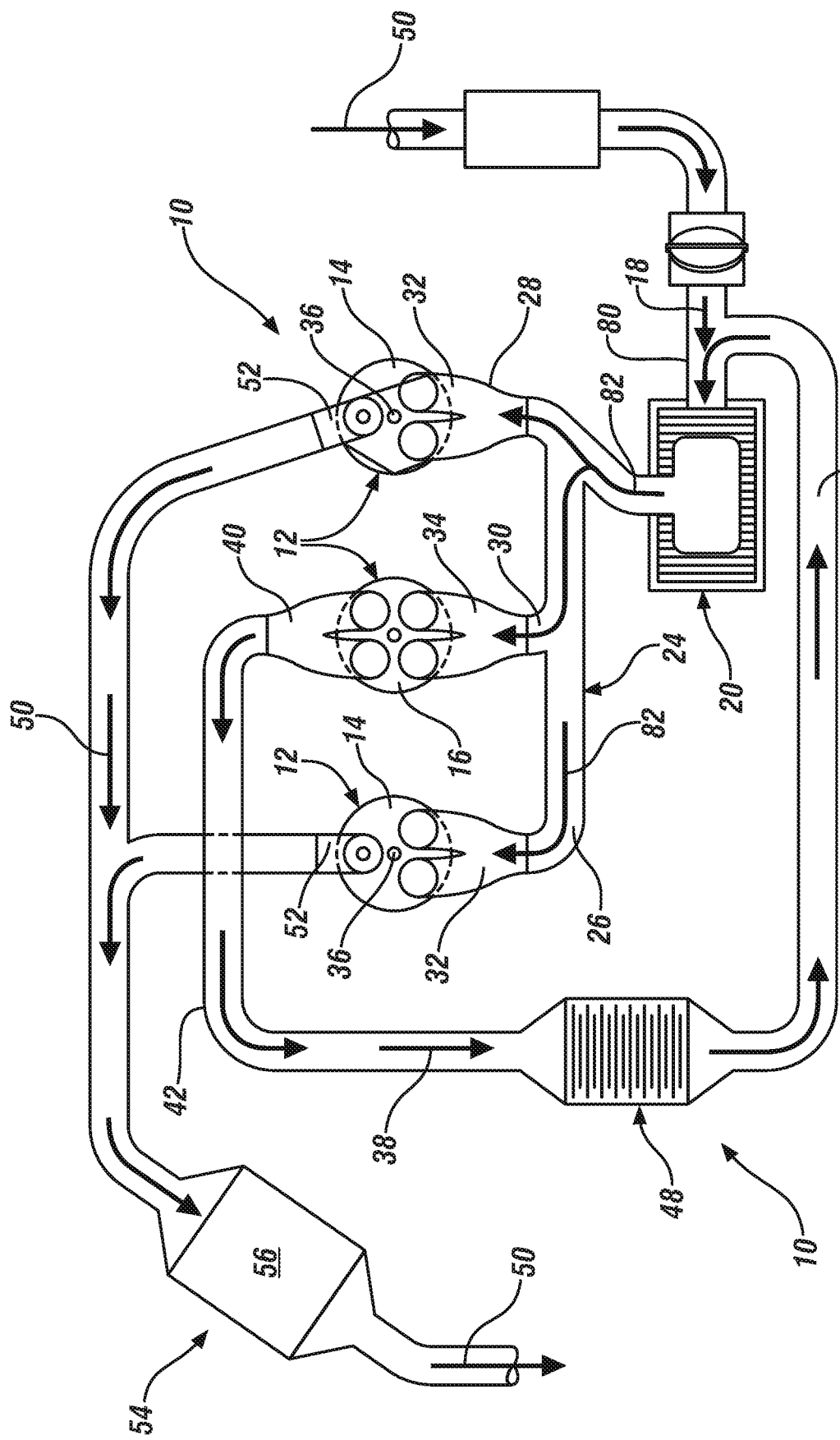
FIG. 2 is a schematic plan view of portions of an internal combustion engine system embodying features of another embodiment of the invention.

Referring now to FIG. 2, another exemplary embodiment of the invention is directed to an internal combustion engine system 10 comprising a plurality of engine cylinders 12. In the embodiment illustrated, the internal combustion engine system 10 includes three engine cylinders 12, however the configuration may also include any number of cylinders (ex. 3, 4, 5, 6, 8, 10, 12, etc.) as well as configurations such as in-line (shown), V-configured, horizontally opposed and the like, without affecting the application of the invention thereto.

Referring to the engine cylinders 12 in the embodiment shown, the first and third cylinders 14 are configured to operate on a four-stroke combustion cycle. Contrarily, the second cylinder 16 is a dedicated EGR cylinder and is configured to operate on a 2-stroke combustion cycle; as will be described in further detail below. Combustion air 18 is compressed by a compressor 20 which may comprise an engine driven supercharger, an exhaust driven turbocharger or a combination of both (i.e. super-turbocharger) and is delivered to each of the engine cylinders 12 through a portion of an intake system 24 comprising intake runners 26, 28 and 30. The intake runners 26, 28 and 30 deliver the compressed combustion air to the 4-stroke cylinders 14 through intake ports 32 and to the 2-stroke cylinder through intake port or ports 34. The combustion air 18 is mixed with fuel in the cylinders 14 and 16, is combusted therein. One or more ignition devices such as spark plugs 36 are located in communication with the cylinders 14 and 16 and operate to ignite the fuel/air mixture therein.

In an exemplary embodiment, exhaust gas 38 from the combustion of fuel and combustion air 18 in the 2-stroke, dedicated EGR cylinder 16 is removed from the cylinder through one or more exhaust ports 40 in fluid communication with an EGR supply conduit 42 extending between, and in fluid communication with, the intake port 80 of the compressor 20 and is configured to deliver the exhaust gas 38 to the compressor 20 for mixture with the combustion air 18 and compression into combustion charge 82. As a result, combustion charge 82 includes a mixture of combustion air 18 and recirculated exhaust gas 38 and is delivered to the to the 4-stroke cylinders 14 through the intake runners 26, 28 and to the 2-stroke cylinder 16 through intake runner 30. The exhaust gas 38 supplied from the 2-stroke, dedicated EGR cylinder 16 to the compressor intake port of the intake system 24 functions to assist in the reduction of throttling losses at low loads and to improve knock tolerance and reduce the level of oxides of nitrogen ("$NO_x$") in the exhaust gas.

In an exemplary embodiment, a heat exchanger 48 may be disposed between the exhaust port 40 of the 2-stroke, dedicated EGR cylinder 16 and the compressor intake port 80 to cool the exhaust gas 38 allowing for a cooler and, thus, denser flow of exhaust gas into the compressor 20. The heat exchanger 48 may be of an air cooled or liquid cooled configuration. In an exemplary embodiment, exhaust gas 50 from the combustion of fuel and the combustion charge 82 in the 4-stroke cylinders 14 is removed from the cylinders through one or more exhaust ports 52 in fluid communication with an exhaust gas treatment system 54 that may include various exhaust gas treatment devices 56 such as a catalytic converter, a selective catalytic reduction device, a particulate trap or a combination thereof.

Figure 5:
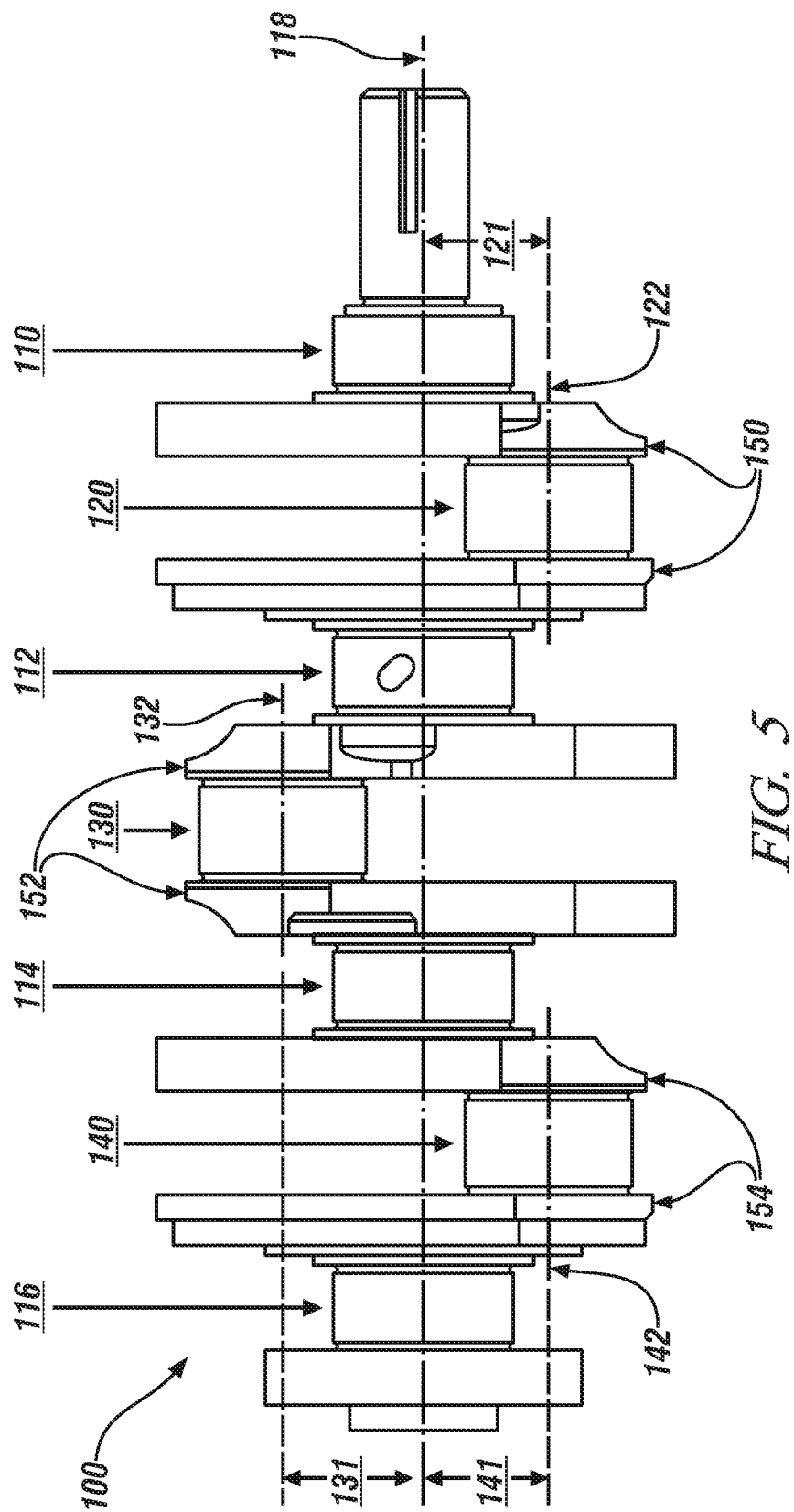
FIG. 5 is a schematic plan view of portions of an internal combustion engine system embodying features of another embodiment of the invention.
Figure 6:
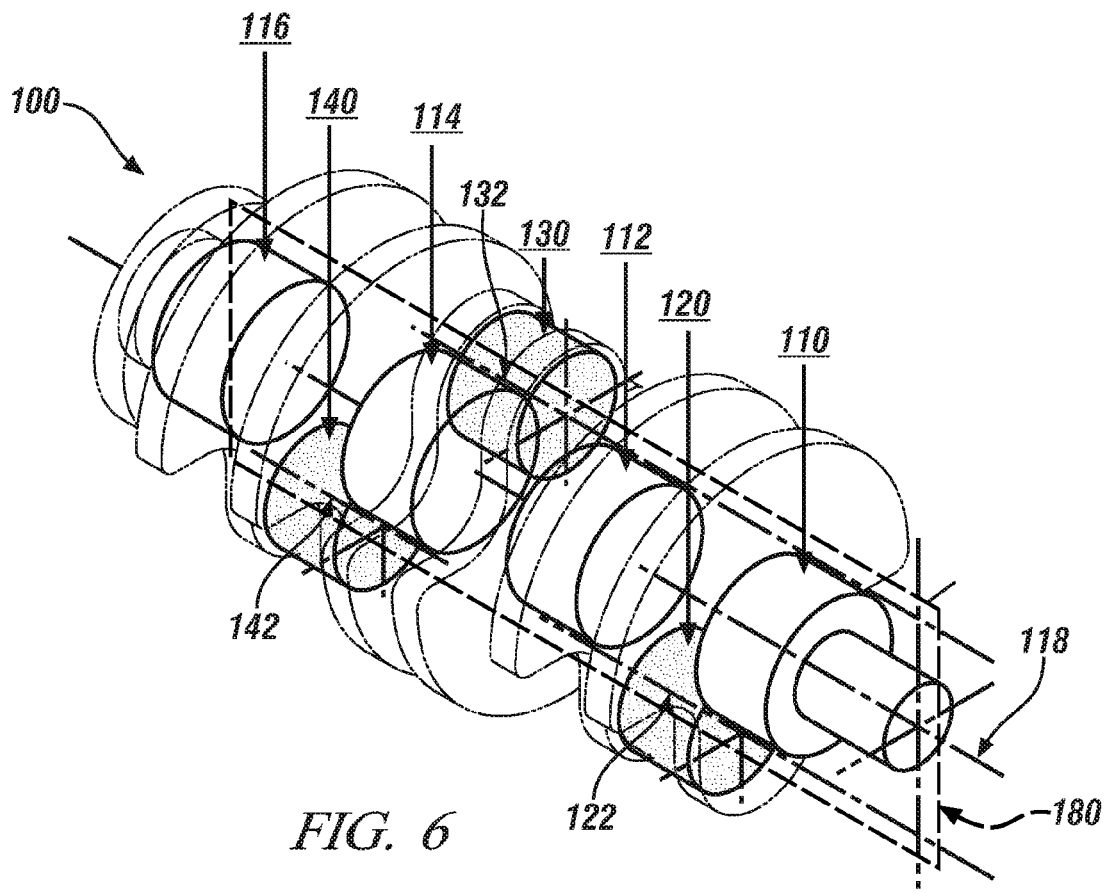
FIG. 6 is a schematic plan view of portions of an internal combustion engine system embodying features of another embodiment of the invention.

In an exemplary embodiment, the 4- and 2-stroke cylinders 14, 16, respectively, interact with a rotating group that comprises, pistons (not shown) that are each associated with a respective cylinder and connected through a respective connecting rod (not shown) to a respective crankpin, the crankpins being disposed on a single crankshaft. In an exemplary embodiment, as shown in FIG. 5 and FIG. 6, a crankshaft 100 for an internal combustion engine comprises a plurality of main journals 110, 112, 114, 116 aligned on a crankshaft axis of rotation 118. A first (i.e., outer) crankpin 120 is disposed about a first crankpin axis 122 and positioned between a first main journal 110 and a second main journal 112. A second (i.e., inner) crankpin 130 is disposed about a second crankpin axis 132 and positioned between the second main journal 112 and a third main journal 114. A third (i.e., outer) crankpin 140 is disposed about a third crankpin axis 142 and positioned between the third main journal 114 and a fourth main journal 116. Each crankpin 120, 130, 140 is aligned on a respective crankpin axis 122, 132, 142 that is parallel to, and spaced radially from, the crankshaft axis of rotation 118.

In some engine configurations, one or more cylinders may be operated differently from other cylinders on the engine. For example, as discussed elsewhere herein, one or more cylinders may be operated at a different level of EGR than other cylinders and may also be operated at different ratios of fuel to air than other cylinders. Accordingly, the power produced in an individual cylinder as a function of its displacement (i.e., specific power) may differ from that of other cylinders. To at least partially compensate for such variations from cylinder to cylinder, it may be desirable to be able to modify the displacement of one or more of the cylinders relative to the displacements of the other cylinders.

Operating with cylinders of differing displacements can be desirable not only to compensate for varying specific power outputs, but can also be useful for adjusting EGR levels in engines where the exhaust gases from one or more cylinders are to be fully re-ingested in another cylinder. For example, in a three cylinder engine, where the exhaust gases from one of the cylinders are to be fully re-ingested by the remaining two cylinders, it may be desirable to operate the EGR-producing cylinder at a smaller displacement than that of the other two cylinders, thereby reducing the level of EGR. This can be accomplished by reducing the stroke of the EGR-producing cylinder. The ability to vary the displacement of individual cylinders allows an engine designer to effectively trade-off the amount of EGR delivered to each of the working cylinders versus the amount of work to be produced by the working cylinders. This capability can enable an engine designer to seek solutions to (i.e., trade-offs between) multiple simultaneous design constraints based on power output, fuel consumption, and emissions limitations.

Since displacement is a function of both stroke and bore diameter, cylinder displacement can be adjusted by changing either of these parameters. It is typically much easier, however, to modify stroke than it is to modify the bore diameter. Therefore, in an exemplary embodiment, as shown in FIG. 5, a crankshaft 100 having at least three crankpins 120, 130, 140 is configured so that at least two of the crankpins 120, 140 are spaced radially a first semi-stroke distance 121, 141 from the crankshaft axis of rotation 118, and a third crankpin 130 is spaced radially a second semi-stroke distance 131 from the crankshaft axis of rotation 118. As shown in FIG. 5, the at least three crankpins form a crankpin grouping in which it is the outer crankpins 120, 140 that are spaced radially a first semi-stroke distance 121, 141 from the crankshaft axis of rotation 118, and it is the inner crankpin 130 that is spaced radially a second semi-stroke distance 131 from the crankshaft axis of rotation 118. It should be appreciated, however, that alternative embodiments are possible in which two adjacent (i.e., axially adjacent) crankpins are spaced radially a first semi-stroke distance from the crankshaft axis of rotation, and the remaining crankpin is spaced radially a second semi-stroke distance from the crankshaft axis of rotation.

In an exemplary embodiment, the first semi-stroke distance 141 differs from the second semi-stroke distance 131. Accordingly, if the bore diameter of the cylinders associated with the first semi-stroke distance is substantially the same as the bore diameter of the cylinder(s) associated with the second semi-stroke distance, then the displacement of the cylinders associated with the first semi-stroke distance will differ from the displacement of the cylinder(s) associated with the second semi-stroke distance. In another exemplary embodiment the first semi-stroke distance 141 is greater than the second semi-stroke distance 131. Accordingly, if the bore diameter of the cylinders associated with the first semi-stroke distance is substantially the same as the bore diameter of the cylinder(s) associated with the second semi-stroke distance, then the displacement of the cylinders associated with the first semi-stroke distance will be greater than the displacement of the cylinder(s) associated with the second semi-stroke distance. In another exemplary embodiment the first semi-stroke distance 141 is less than the second semi-stroke distance 131. Accordingly, if the bore diameter of the cylinders associated with the first semi-stroke distance is substantially the same as the bore diameter of the cylinder(s) associated with the second semi-stroke distance, then the displacement of the cylinders associated with the first semi-stroke distance will be less than the displacement of the cylinder(s) associated with the second semi-stroke distance.

The above-described exemplary embodiments include at least three crankpins that form a crankpin grouping. It should be appreciated that a four cylinder crankshaft may similarly include a grouping of three crankpins with an additional (i.e., fourth) crankpin positioned at the second semi-stroke distance from the crankshaft axis of rotation.

A first pair of crank arms 150 is joined to first crankpin 120 for force transmission between first crankpin 120 and the first pair of crank arms 150. Each of the crank arms 150 is also joined to a respective main journal 110, 112 for transmitting torque between the first pair of crank arms 150 and the main journals 110, 112. A second pair of crank arms 152 is joined to second crankpin 130 for force transmission between second crankpin 130 and the second pair of crank arms 152. Each of the crank arms 152 is also joined to a respective main journal 112, 114 for transmitting torque between the second pair of crank arms 152 and the main journals 112, 114. A third pair of crank arms 154 is joined to third crankpin 140 for force transmission between third crankpin 140 and the third pair of crank arms 154. Each of the crank arms 154 is also joined to a respective main journal 114, 116 for transmitting torque between the third pair of crank arms 154 and the main journals 114, 116.

In an exemplary embodiment, the crankpins 120, 130, 140 form a crankpin grouping arranged to enable, with respect to their three associated cylinders, a "near-even fire" combustion sequence. Thus, in the case of the 3-cylinder internal combustion engine 10, four nearly evenly spaced firing events are produced in about 720 degrees of rotation of the crankshaft. For example, in an engine configuration wherein a 2-stroke cylinder is disposed between a pair of 4-stroke cylinders, such as in the exemplary three cylinder internal combustion engines of FIG. 1 and FIG. 2, the first crankpin 120 is coupled, through a connecting rod (not shown), to a piston (not shown) that is disposed in a first one of the cylinders 14. That cylinder is configured to operate on a four-stroke combustion cycle. Thus, as crankshaft 100 rotates about the crankshaft axis of rotation 118, the piston that is coupled to the first crankpin 120 interacts with working fluid (i.e., fuel, air and EGR mixture) in the first cylinder 14, which encounters a combustion event once for every 720 degrees of crankshaft rotation.

Similarly, the third crankpin 140 is coupled, through a connecting rod (not shown), to a piston (not shown) that is disposed in another of the cylinders 14 configured to operate on a four-stroke combustion cycle. Thus, as crankshaft 100 rotates about the crankshaft axis of rotation 118 (i.e., through its range of rotational crankshaft positions), the piston that is coupled to the third crankpin 140 interacts with working fluid (i.e., fuel, air and EGR mixture) in the third cylinder 14, which also encounters a combustion event once for every 720 degrees of crankshaft rotation.

In accordance with this embodiment, the crankpins for the 4-stroke cylinders 14 (i.e., the first crankpin 120 and the third crankpin 140) are positioned approximately in phase with one another (i.e., approximately positioned for in-phase rotation about the crankshaft axis of rotation) so that a single rotational crankshaft position causes the piston that is coupled to the first crankpin 120 and the piston that is coupled to the third crankpin 140 to both be positioned at or near the top of their strokes. Accordingly, as the crankshaft 100 rotates through its range of crankshaft rotational positions, the piston that is coupled to the first crankpin 120 and the piston that is coupled to the third crankpin 140 both reach the top of their stroke at approximately the same crankshaft rotational position. The combustion events for the first and third cylinders occur in alternating cyclic rotations of the crankshaft such that combustion events associated with the 4-stroke cylinders are approximately evenly spaced apart.

In accordance with this embodiment, the second crankpin 130 is coupled, through a connecting rod (not shown), to a piston (not shown) that is disposed in the cylinder 16 that is disposed between the two 4-stroke cylinders 14. That cylinder is configured to operate on a four-stroke combustion cycle. Thus, as crankshaft 100 rotates about the crankshaft axis of rotation 118, the piston that is coupled to the second crankpin 130 interacts with working fluid (i.e., fuel, air and EGR mixture) in the second cylinder 16, which encounters a combustion event once for every 360 degrees of crankshaft rotation.

In accordance with this embodiment, the second crankpin 130 (i.e., the crankpin associated with the 2-stroke cylinder 16) is positioned approximately 180 degrees out of phase from the first crankpin 120 and the third crankpin 140. Accordingly, the piston that is coupled to the second crankpin 130 reaches the top of its stroke at a rotational crankshaft position approximately 180 degrees apart from the rotational crankshaft position associated with the top of stroke of the piston coupled to the first crankpin 120 and the rotational crankshaft position associated with the top of stroke of the piston coupled to the third crankpin 140. Accordingly, the combustion events for the second cylinder occur in every cyclic rotation of the crankshaft, spaced approximately evenly between combustion events associated with the 4-stroke cylinders. Thus, the second crankpin 130 is coupled with the piston associated with the 2-stroke cylinder 16 and is oriented symmetrically (i.e. slightly more or less than 180 degrees of rotation of the crankshaft) to the first and third crankpins.

In an exemplary embodiment, the axes 122, 132, 142 of all three crankpins are disposed, more or less, in a single plane 180 (FIG. 6), and the axis of rotation 118 of the crankshaft is also disposed, more or less, in approximately the same plane 180. In another exemplary embodiment, the axis of the first crankpin 122 is approximately, more or less, co-linear with the axis of the third crankpin 142.

In the illustrated embodiment, the three crankpins form a crankpin grouping in which the outer crankpins are positioned near a first approximate angular location for in-phase rotation about the crankshaft axis of rotation and the inner crankpin is positioned approximately 180 degrees apart from the first approximate angular location. It should be noted, however, that other arrangements are contemplated such as an arrangement wherein three crankpins form a crankpin grouping in which two adjacent crankpins are positioned near a first approximate angular location for in-phase rotation about the crankshaft axis of rotation, and the remaining crankpin (which is not positioned between the two adjacent crankpins) is positioned approximately 180 degrees apart from the first approximate angular location.

It should be noted that the strokes of the outer crankpins of the crankpin grouping may be configured to be greater than, less than, or equal to the stroke of the inner crankpin as desirable to suit specific needs of the engine. For example, where the 2-stroke (i.e., 180 degree out of phase) cylinder is utilized to supply EGR to two or more 4-stroke cylinders, it may be desirable to increase or decrease the ratio of EGR to be supplied to the four-stroke cylinders. In an exemplary embodiment, the proportion of EGR can be modified by increasing or decreasing the stroke (i.e., range of piston travel) associated with the 2-stroke cylinder relative to that of the 4-stroke cylinders.

In an exemplary embodiment, the crankpin for the 2-stroke, dedicated EGR cylinder 16 may be oriented symmetrically (i.e. slightly more or less than 180 degrees of rotation of the crankshaft) to the crankpins of the 4-stroke cylinders 14 in order to optimize the timing of the delivery of the EGR 46, FIG. 1, or combustion charge 82, FIG. 2, to the 4-stroke cylinders 14. In the embodiments illustrated, in the 3 cylinder in-line internal combustion engine 10, two cylinders can operate on a 4-stroke cycle with the remaining cylinder operating on a 2-stroke cycle to supply recirculated exhaust gas 46 or combustion charge 82 to the 4-stroke cylinders. Such a configuration will yield 4 substantially evenly spaced firing or combustion events in about 720 degrees of crankshaft rotation and yield near 4-cylinder engine performance and combustion smoothness in a in a 3-cylinder engine package 10.

Figure 7:
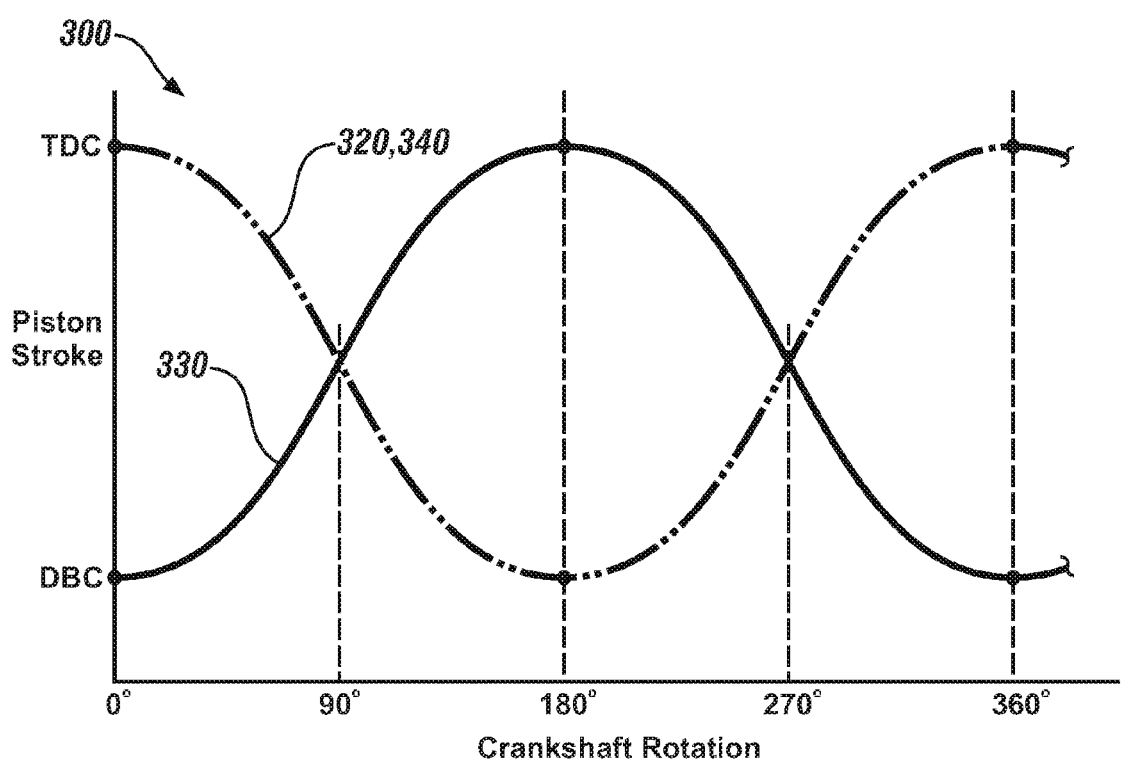
FIG. 7 is a graph depicting operation of an internal combustion engine system embodying features of an embodiment of the invention.
Figure 8:
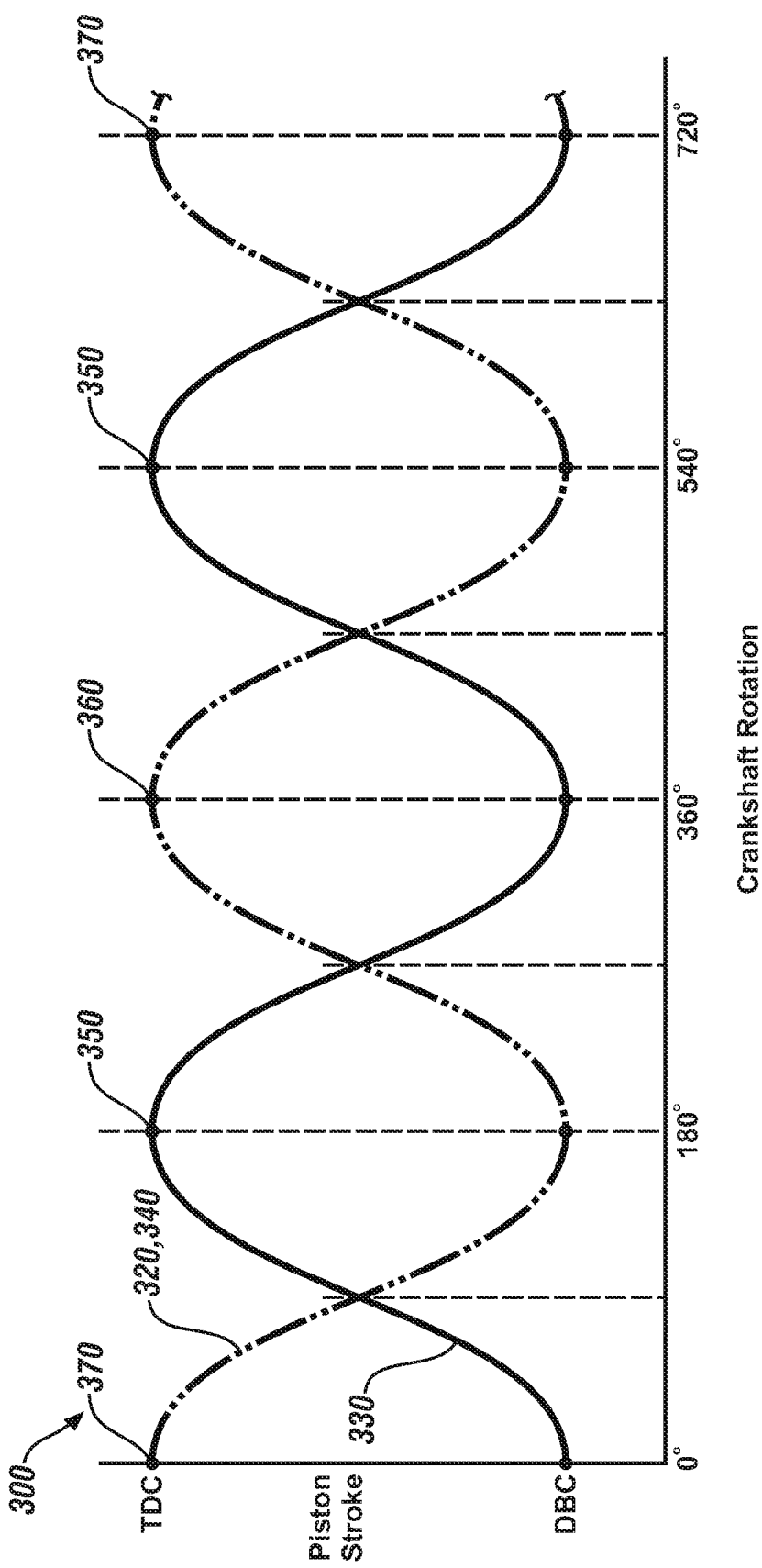
FIG. 8 is a graph depicting operation of an internal combustion engine system embodying features of another embodiment of the invention.

FIG. 7 and FIG. 8 show exemplary relationships 300 between piston stroke and crankshaft rotational position for exemplary engine rotating groups. In an exemplary embodiment, at a first crankshaft rotational position of 0 degrees, a first crankpin 320 and a third crankpin 340 are disposed in a position associated with the top of the stroke (TDC) of their coupled pistons. At this approximate rotational position (with variations associated with advancement or retarding of the ignition timing), a first combustion or firing event 370 occurs in the cylinder associated with the first crankpin 320. At approximately the same crankshaft rotational position, a second crankpin 330 is disposed in a position associated with the bottom of the stroke (BDC) of its coupled piston.

At a second crankshaft rotational position approximately 180 degrees apart from the first crankshaft rotational position, the first crankpin 320 and the third crankpin 340 are disposed in a position associated with the bottom of the stroke (BDC) of their coupled pistons. At approximately the same crankshaft rotational position, the second crankpin 330 is disposed in a position associated with the top of the stroke (TDC) of its coupled piston. At this approximate rotational position (with variations associated with advancement or retarding of the timing of the ignition timing), a second combustion or firing event 350 occurs in the cylinder associated with the second crankpin 330.

Completing a first revolution of the crankshaft at a rotational position of 360 degrees, the first crankpin 320 and the third crankpin 340 are, again, disposed in a position associated with the top of the stroke (TDC) of their coupled pistons. At this approximate rotational position (with variations associated with advancement or retarding of the ignition timing), a third combustion or firing event 360 occurs in the cylinder associated with the third crankpin 340. At approximately the same crankshaft rotational position, the second crankpin 330 is, again, disposed in a position associated with the bottom of the stroke (BDC) of its coupled piston.

At a fourth crankshaft rotational position approximately 540 degrees from the first crankshaft rotational position, the first crankpin 320 and the third crankpin 340 are, again, disposed in positions associated with the bottoms of the strokes (BDC) of their coupled pistons. At approximately the same crankshaft rotational position, the second crankpin 330 is, again, disposed in a position associated with the top of the stroke (TDC) of its coupled piston. At this approximate rotational position (with variations associated with advancement or retarding of the ignition timing), a combustion or firing event 350 occurs in the cylinder associated with the second crankpin 330.

Completing a second revolution of the crankshaft with a total crankshaft rotation of 720 degrees, the first crankpin 320 and the third crankpin 340 are, again, disposed in a position associated with the top of the stroke (TDC) of their coupled pistons. At this approximate rotational position (with variations associated with advancement or retarding of the ignition timing), a combustion or firing event 370 occurs in the cylinder associated with the first crankpin 320. At approximately the same crankshaft rotational position, the second crankpin 330 is, again, disposed in a position associated with the bottom of the stroke (BDC) of its coupled piston. Thus, a "near-even fire" combustion sequence is facilitated, whereby, in the case of the 3-cylinder internal combustion engine 10, four nearly evenly spaced firing events occur in about 720 degrees of rotation of the crankshaft.

In the embodiments illustrated and described, the internal combustion engine 10 will package in the space of a 3-cylinder, in-line engine but will deliver near 4-cylinder performance. Four firing impulses or events will allow the engine to enjoy a lowered idle speed from about 1000 revolutions per minute ("RPM") to about 750 RPM due to smoother feedback to the vehicle, or other installation, resulting in lower fuel consumption. In addition, the output constituents 38 (i.e. exhaust gas) of the 2-stroke, dedicated EGR cylinder 16 are "post-processed" by the 4-stroke cylinders 14 allowing the 2-stroke, dedicated EGR cylinder 16 to be operated richer than stoichiometry without an adverse impact on tailpipe emissions 50. This allows the 2-stroke, dedicated EGR cylinder 16 to be optimized as a supplier of EGR diluent to the 4-stroke cylinders 14.

The operation of the internal combustion engine 10 is relatively straight forward and the configuration of the 2-stroke, dedicated EGR cylinder 16 may comprise a number of 2-stroke designs. For instance, in an exemplary embodiment, a "uniflow" design may be implemented which will utilize exhaust valves in fluid communication with the exhaust ports 40. Intake ports 34 may be dispensed with in exchange for intake ports (not shown) at the bottom of the cylinder 16. The cylinder 16 may be crankcase scavenged but also maybe scavenged with pressurized air from the compressor 20. In the exemplary embodiments illustrated in FIGS. 1 and 2, the layout of the 2-stroke, dedicated EGR cylinder 16 is similar to that of a 4-stroke engine in its configuration. The primary difference between 2-stroke and 4-stroke operation of the cylinder 16 is in the valve-injector-spark timing relative to the position of the engine crankshaft (not shown). This configuration benefits from compressed combustion air 18, FIG. 1, or the compressed combustion charge 82, FIG. 2, delivered by compressor 20. In an exemplary embodiment, a compressor 20 may be dispensed with when the exhaust gas treatment system 54 and the timing of the exhaust valves of the 2-stroke cylinder 16 can be controlled to create "autoscavenging" of exhaust gas from the cylinder 16.

Figure 3:
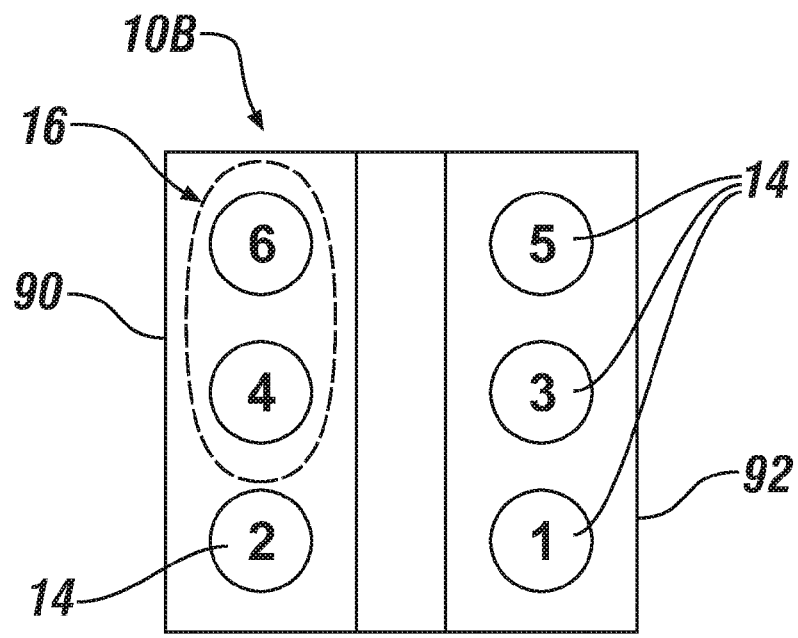
FIG. 3 is a schematic plan view of portions of an internal combustion engine system embodying features of another embodiment of the invention.

As indicated above, the invention is applicable to various engine configurations. In a V-configured engine, such as a V-6 engine, four cylinders can operate on a 4-stroke cycle with the remaining two cylinders operating on a 2-stroke cycle to supply recirculated exhaust gas to the 4-stroke cylinders. Such a configuration will yield 8 firing or combustion events in about 720 degrees of crankshaft rotation and yield near V-8 engine performance in a V-6 package. In the exemplary embodiment of FIG. 3, the V-6 configured internal combustion engine 10B is configured such that two cylinders (4 and 6 in the engine illustrated) on a first cylinder bank 90 are operated on a 2-stroke cycle. The remaining cylinders 1, 2, 3 and 5, which are located in various locations on both first cylinder bank 90 and second cylinder bank 92, operate on a 4 stroke cycle. This configuration is useful in order to optimize the firing order of the cylinders 14, 16 as well as the delivery of recirculated exhaust gas 46 from the 2-stroke cylinders 16 to the 4-stroke cylinders 14.

Figure 4:
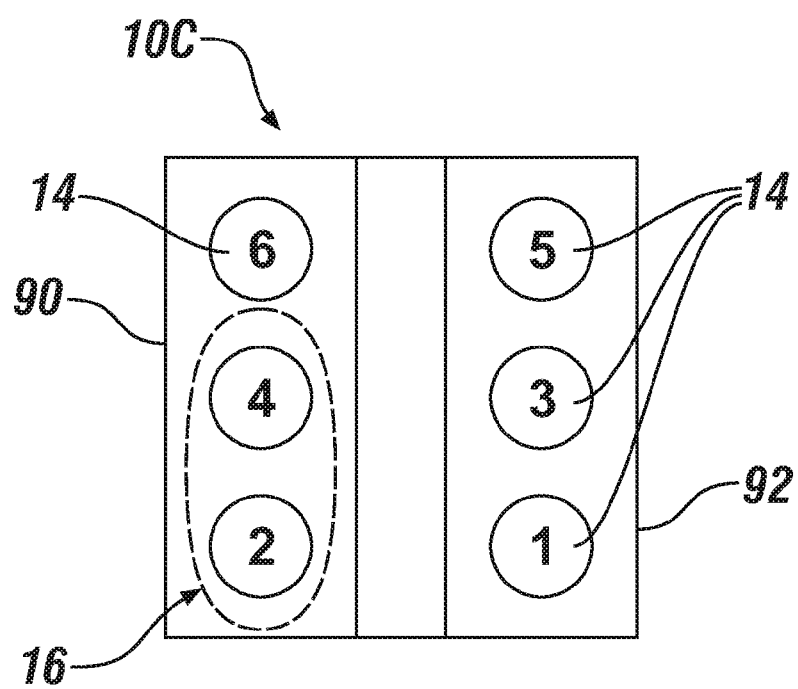
FIG. 4 is a schematic plan view of portions of an internal combustion engine system embodying features of another embodiment of the invention.

In the exemplary embodiment of FIG. 4, the V-6 configured internal combustion engine 10C is configured such that two cylinders (2 and 4 in the engine illustrated) on first cylinder bank 90 are operated on a 2-stroke cycle. The remaining cylinders 1, 3, 5 and 6, which are located in various locations on both first cylinder bank 90 and a second cylinder bank 92, operate on a 4 stroke cycle. This configuration is also useful in order to optimize the firing order of the cylinders 14, 16 as well as the delivery of recirculated exhaust gas from the 2-stroke cylinders 16 to the 4-stroke cylinders 14.

The invention has been described above primarily with reference to its application in a 3-cylinder or a 6-cylinder engine. It should be clear to one skilled in the art of internal combustion engines that engines of other cylinder numbers, and varied configurations, can easily be envisaged and that the invention should not, and can not be limited to those examples provided herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A crankshaft for an internal combustion engine comprising:
   at least four main journals aligned on a crankshaft axis of rotation; and
   at least three crankpins, each disposed about a respective crankpin axis and positioned between the main journals;
   each of the respective crankpin axes being oriented parallel to, and spaced radially from, the crankshaft axis of rotation;
   each of the crankpins being joined to a pair of crank arms for force transmission between the crankpin and the pair of crank arms;
   each pair of crank arms being joined to a respective main journal for transmitting torque between the pair of crank arms and the main journal;
   at least two of the crankpins being spaced radially a first semi-stroke distance from the crankshaft axis of rotation, and a third crankpin being spaced radially a second semi-stroke distance from the crankshaft axis of rotation, wherein the first semi-stroke distance differs from the second semi-stroke distance.

2. A crankshaft as in claim 1, wherein the first semi-stroke distance is greater than the second semi-stroke distance.

3. A crankshaft as in claim 1, wherein the first semi-stroke distance is less than the second semi-stroke distance.

4. A crankshaft as in claim 1, wherein the at least three crankpins form a crankpin grouping in which the outer crankpins are spaced radially the first semi-stroke distance from the crankshaft axis of rotation, and the inner crankpin is spaced radially the second semi-stroke distance from the crankshaft axis of rotation.

5. A crankshaft as in claim 4, wherein the first semi-stroke distance differs from the second semi-stroke distance.

6. A crankshaft as in claim 4, wherein the first semi-stroke distance is greater than the second semi-stroke distance.

7. A crankshaft as in claim 4, wherein the first semi-stroke distance is less than the second semi-stroke distance.

8. A crankshaft as in claim 1, wherein the at least three crankpins form a crankpin grouping in which two adjacent crankpins are spaced radially the first semi-stroke distance from the crankshaft axis of rotation, and the remaining crankpin is spaced radially the second semi-stroke distance from the crankshaft axis of rotation.

9. A crankshaft as in claim 8, wherein the first semi-stroke distance differs from the second semi-stroke distance.

10. A crankshaft as in claim 8, wherein the first semi-stroke distance is greater than the second semi-stroke distance.

11. A crankshaft as in claim 8, wherein the first semi-stroke distance is less than the second semi-stroke distance.

12. A crankshaft as in claim 1, wherein the three crankpins of the crankpin grouping and the axis of rotation of the crankshaft are all disposed approximately in a single plane.

13. A rotating group for a three cylinder internal combustion engine, the rotating group comprising:
   three pistons, each associated with a respective cylinder and connected through a respective connecting rod to a respective crankpin, the crankpins being disposed on a single crankshaft;
   wherein the crankshaft comprises:
      at least four main journals aligned on a crankshaft axis of rotation; and
      at least three crankpins, each disposed about a respective crankpin axis and positioned between the main journals;
      each of the respective crankpin axes being oriented parallel to, and spaced radially from, the crankshaft axis of rotation;
      each of the crankpins being joined to a pair of crank arms for force transmission between the crankpin and the pair of crank arms;
      each pair of crank arms being joined to a respective main journal for transmitting torque between the pair of crank arms and the main journal; and
      at least two of the crankpins being spaced radially a first semi-stroke distance from the crankshaft axis of rotation, and a third crankpin being spaced radially a second semi-stroke distance from the crankshaft axis of rotation, wherein the first semi-stroke distance differs from the second semi-stroke distance.

14. A crankshaft as in claim 13, wherein the first semi-stroke distance is greater than the second semi-stroke distance.

15. A crankshaft as in claim 13, wherein the first semi-stroke distance is less than the second semi-stroke distance.

16. A crankshaft as in claim 13, wherein the at least three crankpins form a crankpin grouping in which the outer crankpins are spaced radially the first semi-stroke distance from the crankshaft axis of rotation, and the inner crankpin is spaced radially the second semi-stroke distance from the crankshaft axis of rotation.

17. A crankshaft as in claim 16, wherein the first semi-stroke distance is greater than the second semi-stroke distance.

18. A crankshaft as in claim 16, wherein the first semi-stroke distance is less than the second semi-stroke distance.

* * * * *